July 12, 1932.  E. E. BROSIUS  1,867,349
VALVE
Filed Feb. 23, 1928   5 Sheets-Sheet 1
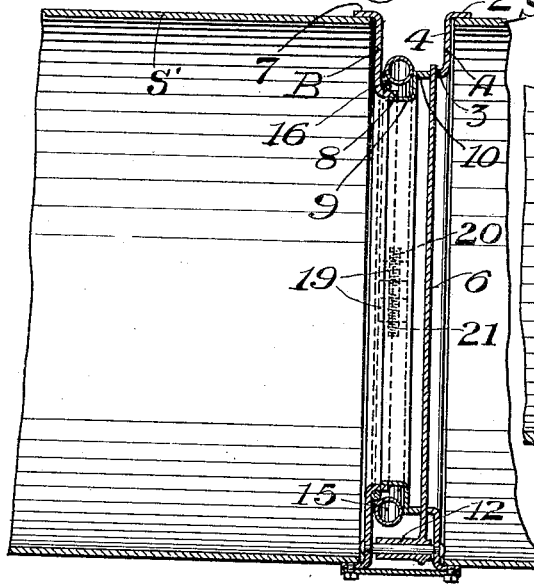
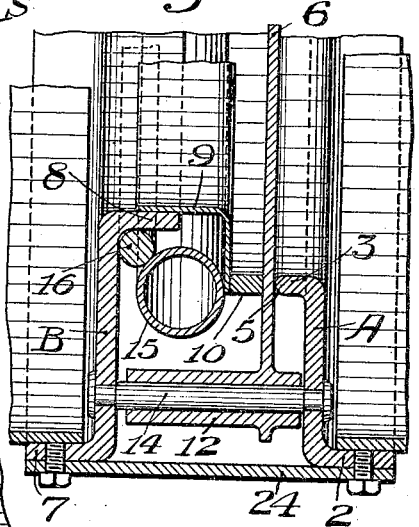
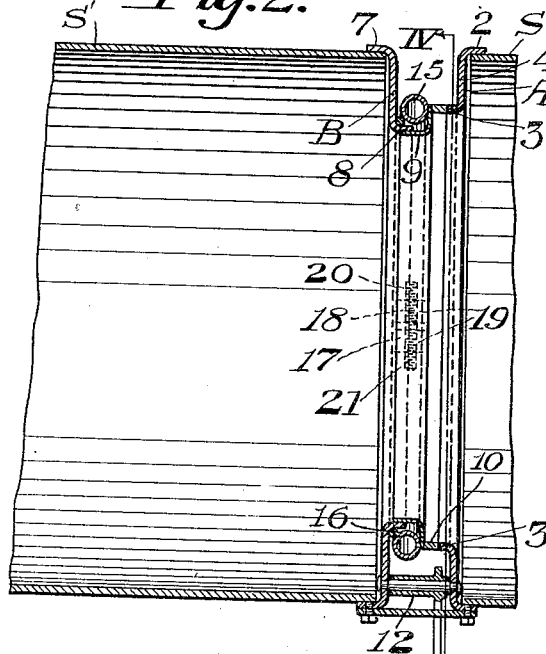
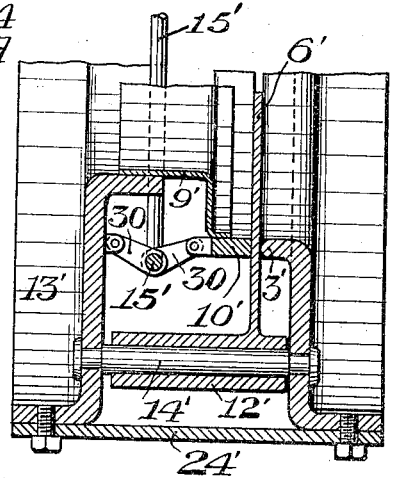

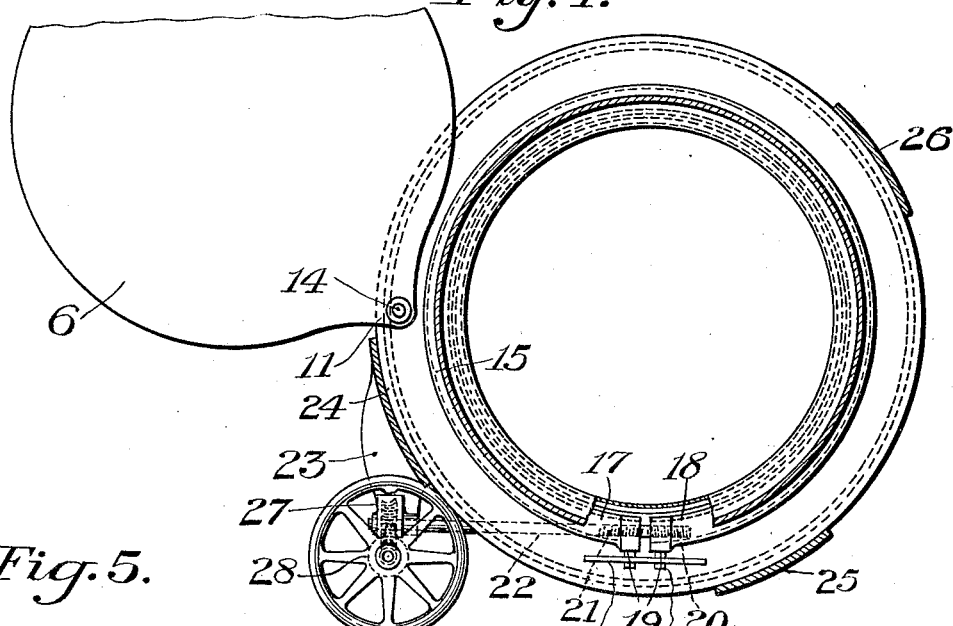
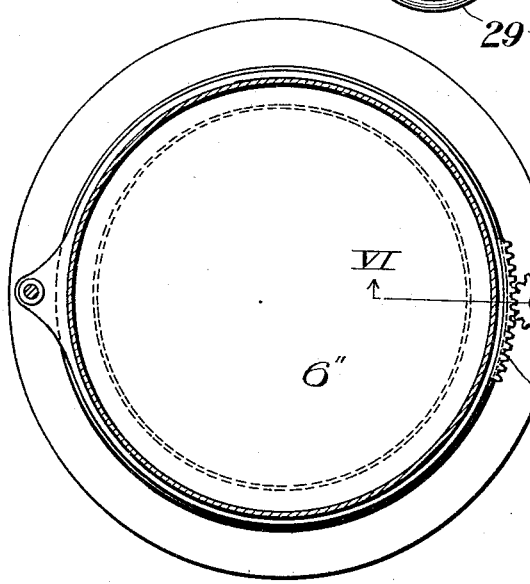
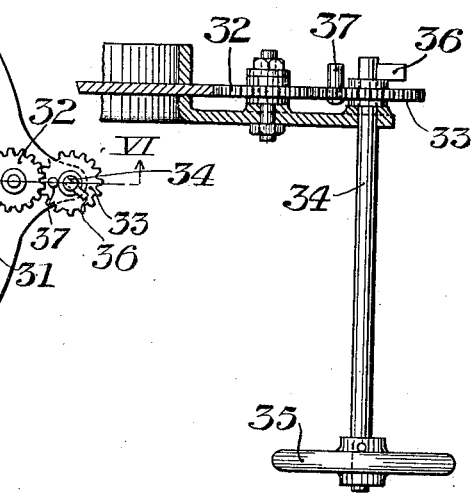

July 12, 1932.  E. E. BROSIUS  1,867,349
VALVE
Filed Feb. 23, 1928   5 Sheets-Sheet 5

INVENTOR
Edgar E. Brosius,
by Byrnes, Stebbins & Parmelee
his attys.

Patented July 12, 1932

1,867,349

UNITED STATES PATENT OFFICE

EDGAR E. BROSIUS, OF PITTSBURGH, PENNSYLVANIA

VALVE

Application filed February 23, 1928. Serial No. 256,301.

The present invention relates broadly to valve structures, and more particularly to an improved valve especially adapted for use in connection with large gas conduits or mains such as utilized in the handling of gases incident to the operation of blast furnaces, hot blast stoves, ovens, gas producers, and the like, although the utility of the invention is not limited with respect to its use.

It is customary in the handling of gases of the character referred to, to employ large mains. Periodically, usually at more or less infrequent intervals, it becomes desirable or necessary to cut off the flow of gas through such conduits. For this purpose it has been customary in the art to utilize so-called "goggle valves". Such valves embody an imperforate portion which when in position across the main or conduit is effective for closing the same against the flow therethrough of any gases, and with a perforate portion, usually comprising a single large opening, which when in registry with the flow opening through the conduit permits the desired passage of the gases. Due to the fact that valves of this type are sometimes only operated at intervals of several months, it is desirable to provide seats of such nature that positive movement thereof may be effected to insure tight seating of the valve upon movement in one direction, and to provide for the easy manipulation of the valve upon movement in the opposite direction.

In spite of this, considerable difficulty is occasionally experienced in breaking loose a valve which has remained in one position for a considerable period of time. After the valve has been in use and the cooperating seating portions have secured accumulations or have been deformed, the necessity for positive seating means increases, as will be apparent.

To those skilled in the art, it will be obvious that many advantages are inherent in the use of a valve of such construction that it may be moved bodily into a position entirely laterally of the conduit so as to permit changing or repairing thereof when in inoperative position without the necessity of tearing down any portion of the main. The present invention has for one of its objects the provision of a valve of the character indicated capable of movement to a position entirely laterally of the main, as set forth, whereby it may be removed or repaired at will without interfering with the free flow of gas to and from the points desired.

Another object of the present invention is to provide a relatively inexpensive valve construction of extremely light weight with respect to both the valve and its operating parts as compared to valves now utilized for the accomplishment of the same results.

Still another object of the invention is to obtain what may be designated as a single line contact both when the valve is in closed position and when it has been moved to inoperative position. By this means the disadvantages inherent in the use of ordinary goggle valves in which a seal must be made with both sides of the valve body when in inoperative position are obviated.

A still further object of the invention is to provide a valve which may be easily installed without adding any substantial weight to any relatively localized portion of the main or conduit, and which may be operated in a minimum amount of room. To this end the mounting for the valve is preferably located within the periphery of the adjacent sections of the conduit with which the valve cooperates.

Still a further object of the invention is to provide positive sealing means comprising relatively movable seats with operating connections effective substantially in the plane of the seats whereby a more desirable and advantageous sealing of the valve is insured.

In the accompanying drawings there are shown more or less diagrammatically for purposes of illustration only, certain preferred embodiments of the present invention, it being understood that the drawings do not define the limits of my invention, as changes in the construction and operation of the parts disclosed therein may be made without departing either from the spirit of my invention or the scope of my broader claims.

In the drawings:—

Fig. 1 is a longitudinal sectional view through one form of a valve constructed in accordance with the present invention, in cooperative relation to a conduit, this figure of the drawings showing the valve in closed or operative position.

Fig. 2 is similar to Fig. 1, but showing the valve in open or inoperative position.

Fig. 3 is a partial sectional view, on an enlarged scale, illustrating one form of valve mounting and operating connections for sealing the valve.

Fig. 3a is a view similar to Fig. 3, showing a slightly modified embodiment of the invention.

Fig. 4 is a transverse sectional view on a line IV—IV of Fig. 2, certain of the parts being shown in elevation.

Fig. 5 is a view similar to Fig. 4 showing the valve in closed position with means for releasing the same.

Fig. 6 is a detail sectional view, on an enlarged scale, on the line VI—VI of Fig. 5.

Figure 7:
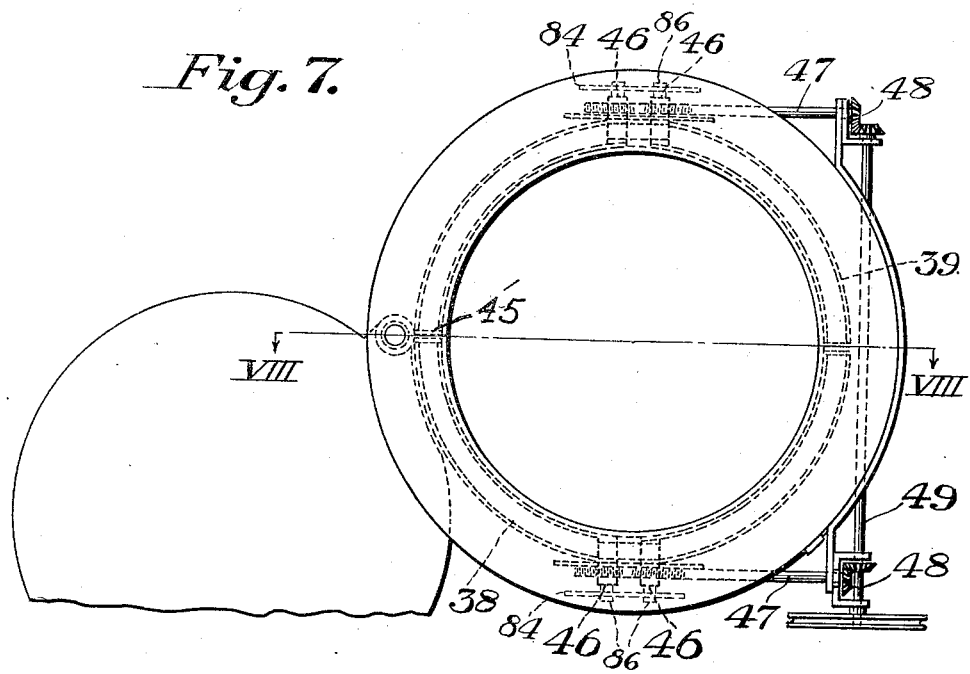
Fig. 7 is a view similar to Fig. 4 illustrating another embodiment of the invention.
Figure 8:
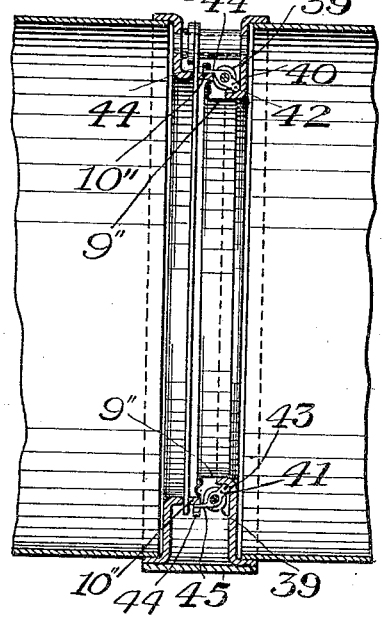
Fig. 8 is a longitudinal sectional view along the line VIII—VIII of Fig. 7.
Figure 9:
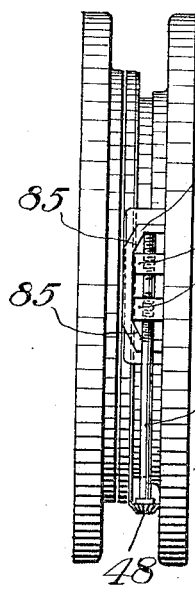
Fig. 9 is a side elevational view of a portion of the valve of Fig. 7.
Figure 10:
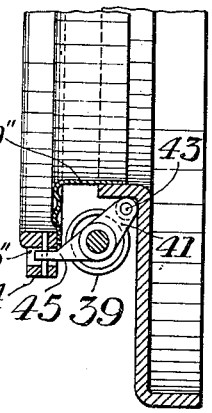
Fig. 10 is a detail sectional view, on an enlarged scale, illustrating the operating connections for effecting relative movement of the valve seats.

In carrying out the present invention, which as before intimated, is not limited with respect to its utility to any particular type of conduit construction, there may be provided a relatively fixed valve seat in the form of a sheet steel flanged head A comprising oppositely turned edge portions 2 and 3 preferably lying substantially parallel to each other and connected by an intermediate portion 4 substantially normal thereto.

The flange 2 is adapted to be secured in any desired manner to the adjacent end of a conduit section S through which the medium to be controlled passes. The flange 3 is preferably formed as indicated in detail in Fig. 3 with a curved seating and sealing portion 5 adapted to establish a substantial line contact with the valve disc 6.

Cooperating with the head A is an oppositely facing head B of similar construction having its flange 7 secured to the adjacent end of the conduit section S′ and having its flange 8 inturned in such manner as to cooperate with a flexible sealing member 9. This sealing member may be secured to the flange 8 adjacent one edge in any desired manner, as for example, by welding, and adjacent its opposite edge it has secured thereto a relatively movable seat 10 adapted to extend in substantially axial alignment with the flange 3 and the seat 5 and to cooperate with the opposite side of the valve disc 6.

To those skilled in the art it will be apparent that the heads A and B may be comparatively easily formed from the desired stock by a stamping and pressing operation, and may be of a gauge substantially equal to the gauge of the material constituting the conduit, although this may be varied as found desirable. Such a construction is extremely light while affording sufficient strength and rigidity to satisfactorily perform the functions contemplated. When attached in position on adjacent conduit sections they lie substantially flush therewith and therefore occupy a minimum amount of room without requiring any complicated, cumbersome, or expensive supporting or reinforcing structure exteriorly of the conduit.

The valve disc 6, which may comprise a substantially flat sheet of suitable material of such a composition as to satisfactorily withstand the corrosive influence of the fluids with which it comes into contact is preferably formed, as clearly indicated in Fig. 4 of the drawings, with a projection 11 adapted to cooperate with the sleeve 12 rotatably journalled on a pin 14 located within the periphery of the conduit and preferably secured to the inwardly projecting portions of the heads A and B as clearly apparent from Fig. 3. The sleeve 12 preferably extends a sufficient distance to one side of the valve disc to abut against one surface of the head A to thereby define, within certain limits, the plane of movement of the valve disc during operation thereof. On the opposite side of the disc, the sleeve preferably projects a distance slightly less than the width of the space between the disc and the adjacent surface of the head B to permit a slight axial movement of the disc as may be required for proper seating thereof and without permitting undue movement of the disc out of a predetermined plane when it has moved to inoperative position as indicated in Fig. 4 of the drawings.

With the valve in operative position as indicated in Figs. 1 and 3 of the drawings, it is desirable to provide means, preferably in the form of operating connections, for effecting relative movement between the seats 3 and 10 to accomplish the desired sealing between the seats and the valve disc. Such a relative movement accompanied by flexing of the sealing member 9 may be accomplished by the provision of an expansile and contractile annulus 15 mounted between the member 9 and the head B in such manner as to be effective substantially in the plane or axial line of the seats 3 and 10. Permanently positioned for cooperation with the annulus 15 is a cam surface 16 conveniently formed by the utilization of a rod or tube bent in such manner as to lie within the angle included between the flange 8 and the adjacent portion of the head B, and secured in position in any desired manner, as, for example, by welding.

The annulus 15 is preferably split in such manner as to provide slightly spaced end portions 17 and 18, which end portions may carry lugs or projections 19 internally threaded in opposite directions for cooperation with oppositely threaded portions 20 and 21 of an operating shaft 22 projecting laterally of the valve and journalled at its outer end in a suitable bracket 23. This bracket may comprise a base 24 curved to conform to the curvature of the heads A and B so as to permit the same to be secured thereto and serve as a reinforcement to assist in maintaining the heads and conduit sections with which they cooperate in the desired alignment. Similar tie members 25 and 26, as indicated in section in Fig. 4, may also be provided at spaced points around the periphery of the heads for accomplishing the same result, it being only necessary that adjacent tie members on opposite sides of the pivot 14 shall be spaced a sufficient distance to permit the movement therebetween of the valve disc 6.

For effecting rotation of the shaft 22 in one direction or the other, it may have secured to its outer end, a worm wheel 27 cooperating with a worm 28 secured in any desired manner to a hand wheel 29 for operation thereby. By reason of this construction it will be apparent that upon operation of the hand wheel in one direction the shaft 22 will be rotated in such manner as to draw together the ends 17 and 18 of the annulus 15 and thereby cause it to ride up on the cam surface 16 and force the seat 10 toward the seat 3 to effect the desired clamping therebetween of the valve disc. Upon operation of the hand wheel in the opposite direction the adjacent ends of the annulus 15 will be separated, thereby moving the annulus in the opposite direction to free the valve disc and permit it to be more easily moved into its open or inoperative position.

In Fig. 3a there is illustrated a slightly modified embodiment of the invention, in which parts corresponding to parts already described are designated by the same reference characters having a prime affixed thereto. In this form of the invention the expansile and contractile annulus is replaced by a band 15′ carrying at desired intervals throughout its length oppositely extending toggle arms 30, pivoted respectively to the head B′ and to the seat 10′. By reason of this construction, as the band 15′ is contracted in any desired manner, as for example, that described for the annulus 15, the toggles 30 will be straightened and the seat 10′ forced toward the seat 3′. As the band 15′ is expanded, the toggles will be moved to open position, and during this movement will be effective for positively moving the seat 10′ away from the valve disc 6′.

With both forms of operating connections herein described, it will be apparent that the force producing sealing movement is effective substantially in line with the seats whereby the sealing pressure is exerted directly at the points required. In this manner, the use of levers, struts, and the like, is obviated, and the desired sealing is effected without distorting the conduit sections, the flexible sealing member 9 or 9′ yielding to the amount required to permit the necessary relative movement between the seats.

When the valve is in open position, the same operating connections are effective for moving the seats 3 and 10, or 3′ and 10′, directly into engagement with each other to thereby form continuous side walls constituting an extension of the conduit sections and serving to prevent the leakage of fluid therefrom. Due to the fact that the valve disc when in inoperative position lies completely to one side of the seats provided for its reception when in operative position, the possibility of leakage of gas from the conduit is minimized as compared to normal goggle valves in that there is a single line of sealing, while with the usual goggle valve, a double line of sealing is required. When the valve is in closed position, a single line of sealing prevents leakage of the gas since with the valve in this position there is in no case a gas pressure on opposite sides thereof. This feature has been found to be extremely desirable and to appreciably increase the efficiency of the valve.

In Figs. 5 and 6 of the drawings I have shown a slightly modified embodiment of the invention in which the valve disc 6″ is provided at a desired point on its periphery with a section of a segmental rack 31 adapted to cooperate with a gear 32 driven by a gear 33. The gear 33 is loosely mounted on a shaft 34 on one end of which is mounted an operating hand wheel 35, and on the opposite end of which is mounted a projection 36 adapted, at a predetermined point in the rotation of the shaft 34, to engage a stop 37 projecting upwardly from the gear 33. This construction permits the hand wheel to be rapidly spun in such manner that the projection 36 engages the stop 37 to produce an appreciable impact which is transmitted in the form of a hammer blow through the gears to the valve disc 6'' for breaking it loose. Such an arrangement is particularly desirable in cases where the valve has remained in closed position for a considerable length of time.

In Figs. 7 to 10, of the drawings, there is shown still another embodiment of the invention different from that already described in that the operating connections comprise semi-circular sections 38 and 39, each being supported for swinging movement in a predetermined arc by links 40 and 41 respectively pivoted at their outer ends to the sections and at their inner ends to suitable pivots 42 and 43. The sections may be further guided, if desired, by links 44 and 45 projecting in the opposite direction and preferably directly secured to the seat 10'' for effecting movement thereof, the seat 10'' being carried by a flexible sealing member 9'' as before described.

Each of the sections is provided on its opposite ends with an internally threaded projection 46 adapted to cooperate with oppositely threaded portions of parallelly extending shafts 47, each similar in construction to that of the shaft 22 previously described, and provided on their outer ends with bevel gears 48 for cooperation with a common operating shaft 49 constructed for operation in any desired manner. This construction differs principally from the constructions previously described in detail only in that its operating characteristic is that resulting from the movement of separate sections toward and away from each other as distinguished from the contraction or expansion of a single member to produce the same results.

In Figs. 11 to 14 there is illustrated a slightly modified form of valve construction similar generally to that shown in Figs. 7 to 10 in the provision of separately and simultaneously movable sections, but differing from the forms of all of the figures specifically in the means for operating the sections and in the means for operating the valve gate.

This form of the invention, in common with all of the forms herein described, comprises heads $a$ and $b$ carrying seats 50 and 51 respectively. These heads are illustrated as tied together between the points 52 and 53 by a tie plate 54 extending circumferentially of the heads, and provided with a slot for the reception of the valve disc. Also preferably cooperating with each of the heads and with the tie plate are angle flanges 55 facilitating the positioning of the valve between adjacent conduit sections, which sections will also preferably have similar flanges adapted to be bolted to the flanges 55.

The operating connections for the seat 51 comprise sections 56 each having mountings 57 similar to those described in connection with Figs. 7 to 10 and adapted to be operated by shafts 58 each carrying a worm wheel 59 for cooperation with worms 60 on a shaft 61 extending transversely to a point outside of the heads. As apparent more particularly from Figures 11 and 12, there are provided spaced housings 62 within which the shaft 61 is journalled and within which the worm wheels 59 and worms 60 are mounted. In this manner a proper supply of lubricant for the gears may be maintained in proper relation thereto at all times.

Figure 14:
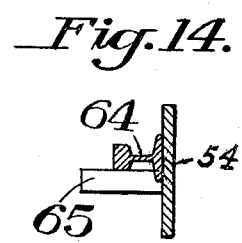
Fig. 14 is a partial detail sectional view, on an enlarged scale, along the line XIV—XIV of Fig. 11.
Figure 15:
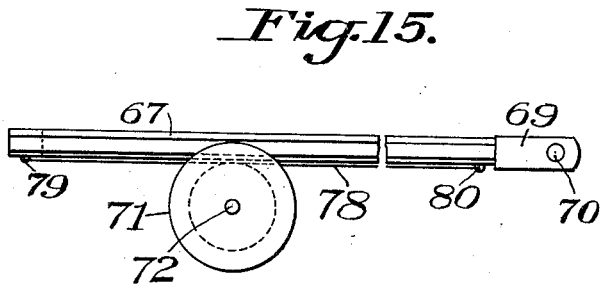
Fig. 15 is a diagrammatic view illustrating operating connections for effecting movement of the valve disc of Figures 11 and 12.

The tie plate 54 is indicated as being reinforced by a rail 64 extending therearound, the rail at a point intermediate its length having a bracket 65 secured thereto, as indicated in detail in Figure 14. This bracket is provided for cooperation with a guide assembly for the valve disc 66. This assembly, as shown more particularly in Fig. 13, comprises rails 67 mounted with their bases in opposed relationship to provide a space 68 therebetween of sufficient width for the passage of the valve disc. Adjacent their outer ends each of the rails has a bearing block 69 secured thereto and drilled to receive a pivot 70 extending through the valve disc. The opposite end of the guide assembly cooperates with a drum 71 carried on a shaft 72 mounted in suitable bearings on a bracket structure 73 projecting laterally from the valve structure. The drum is adapted to be rotated through the medium of the shaft 72 by a worm wheel 74 also secured to this shaft and meshing with a worm 75 on a shaft 76 driven in any desired manner, as by chain and pulley 77. Extending around the drum as indicated diagrammatically in Fig. 15 is a cable 78, one end of which is dead-ended to the guide assembly as indicated at 79, and the opposite end of which extends to and is secured to the opposite end of the guide assembly as indicated at 80.

Figure 11:
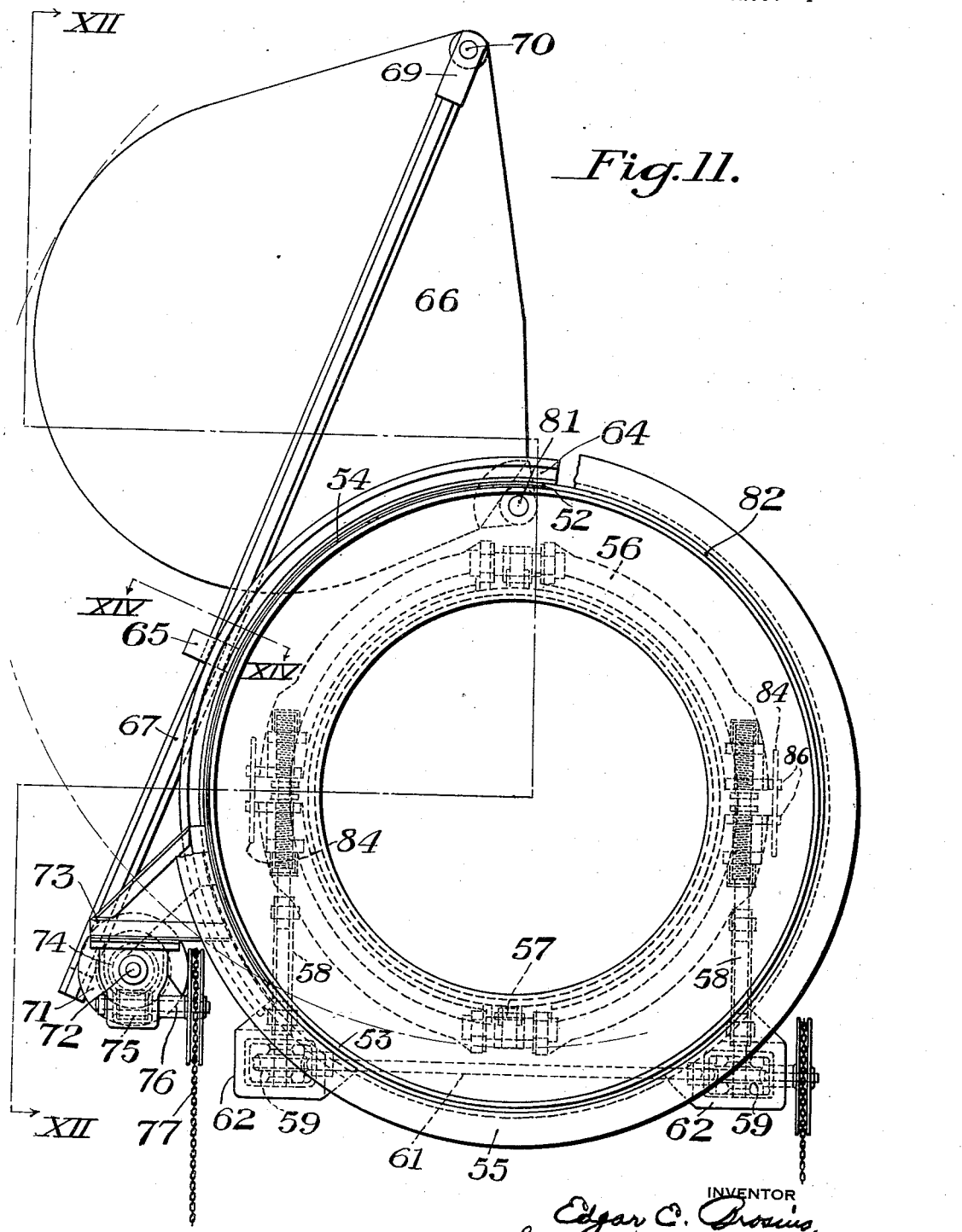
Fig. 11 is a top plan view of a modified form of valve, the valve not being shown in cooperative relation to a conduit.
Figure 12:
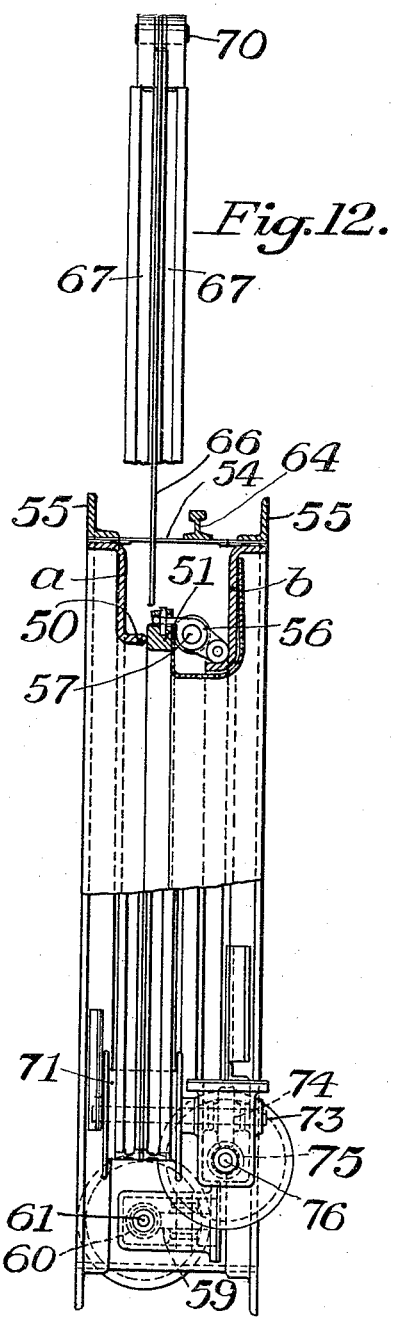
Fig. 12 is a view partly in section and partly in elevation of the form of valve shown in Fig. 11, the view being taken along the line XII—XII of Fig. 11.
Figure 13:
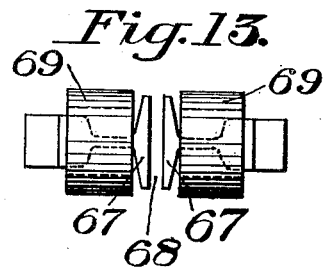
Fig. 13 is an end elevational view, on an enlarged scale, of the guiding means for the valve of Figures 11 and 12.

Upon rotation of the drum in one direction, it will be apparent that the pull of the cable is effective for moving the entire guide assembly and valve disc in a counter clockwise direction about its pivotal mounting 81, as viewed in Fig. 11 of the drawings, and to thereby move it into operative position for cutting off flow through a conduit, the pull being transmitted from the cable through the guide assembly to the valve disc. Upon movement of the drum in the opposite direction, the valve disc will be moved in the opposite direction into the position indicated in full lines in Fig. 11. During this movement it will slide through the slot referred to in the tie plate 54. It will be apparent that between the points 52 and 53 on the side of the valve structure opposite the guide assembly the heads $a$ and $b$ may be rigidly tied together by a tie plate 82 of any desired construction.

It has been found in actual experience that the one-piece annulus or the sectional annulus does not tend to move axially of the conduit during the expanding thereof. The axial movement tends more directly to free the valve and permit its easier movement. In order to insure a definite movement of the annulus or of the sections during opening or expanding movement, I may provide guiding means in the form of a cam track 84 as indicated in plan in Figs. 4, 7 and 11, and in elevation in Fig. 9. This cam track may embody oppositely inclined portions 85 cooperating with projections 86 so that as the annulus opens up, the lugs 86 will follow the inclined portions 85 and pull the annulus bodily away from the valve.

With all of the forms of my invention, the valve comprises two main heads of a comparatively light, rigid and inexpensive construction adapted to be easily secured to adjacent conduit sections, one of the heads having a relatively rigid seat and the other of the heads having a relatively movable seat. The seats are within the periphery of the conduit sections and relative movement therebetween is obtained by operative connections producing pressure substantially in line with the seats. In all cases the valve disc is preferably carried by a pivotal mounting located within the periphery of the conduit, and of such construction as to serve to rigidly tie together the heads and thus strengthen the resulting structure.

Also, with all forms of the invention there is secured a single line contact when the valve is moved to completely open position entirely exteriorly of the seats so that sealing in only one plane is necessary. At all times, operating connections are available for producing a sealing pressure by a positive relative movement between the seats whether the valve disc is in position therebetween or not. With the valve disc out of operative position, it may be bodily removed and replaced or repaired as may be found necessary without interfering with the conditions of flow through the conduit.

All of the above advantages result from a comparatively light relatively compact and comparatively inexpensive valve structure substantially confined with respect to most of its structural parts to points entirely within the peripheral contour of the conduit, thereby obviating special strengthening struts, braces or the like exteriorly thereof, and obviating any distortion to the conduit and valve such as result by the operation or support thereof through laterally extending lever-like and over-hung supports and projections.

I claim:—

1. In a valve, a pair of substantially annular seats, a valve disc movable into a position between said seats and into a position entirely outside of said seats, and power means operable radially of the valve and external thereto for effecting a predetermined relative movement between said seats to clamp the valve when in position therebetween and to bring said seats together when the valve is out of position therebetween.

2. In a valve, a pair of seats, a valve disc cooperating therewith, and means for effecting a predetermined relative movement between said seats, said means being movable radially of the valve and effective substantially in line with said seats.

3. In a valve, a relatively fixed seat, a relatively movable seat, said seats comprising annular bodies of substantially the same diameter extending in axial alignment with each other, a valve disc movable into a position between said seats and into a position entirely outside of said seats, and circumferentially adjustable means including a contractible split ring for effecting relative movement between said seats to clamp the valve when in position therebetween and to bring said seats together under pressure when the valve is out of position therebetween, to provide a single line contact for sealing purposes.

4. In a valve structure, a casing comprising relatively movable substantially axially aligned seats adapted to cooperate with opposite sides of a valve body, and means effective substantially in line with said seats for effecting relative movement therebetween, said means comprising an annular member with means for varying its effective diameter.

5. In a valve, relatively movable seats, a flexible sealing member cooperating with one of said seats, a contractile and expansile member for effecting relative movement of said seats, and means for producing an axial movement of said contractile and expansile member upon changes in the effective diameter of the contractile and expansible member.

6. In a valve structure, a conduit, a valve adapted for lateral rotary movement into and out of cooperative relation to said conduit, and actuating and stiffening means for said valve, said means comprising a rod connected to and supporting said valve.

7. In a valve structure, a conduit, a substantially flat valve rotatably movable into and out of cooperative relation to said conduit, and a rigid actuating member for said valve adapted to lie closely adjacent to and support the valve upon its movement out of cooperative relation to the conduit.

8. In a valve structure, a conduit, a disclike valve rotatably movable transversely of said conduit into and out of cooperative relation thereto, and means for moving the valve including reciprocable links pivoted thereto and adapted to extend transversely of and closely adjacent said valve for supporting the same when in inoperative position.

9. In a valve structure, a conduit, a disc-like valve rotatably movable transversely of said conduit into and out of cooperative relation thereto, and operating means secured to and adapted to extend transversely of and closely adjacent said valve for supporting the same when in inoperative position and during its movement into inoperative position.

10. In a valve structure, a conduit, a valve movable into and out of cooperative relation with said conduit, and means secured to the valve for moving it and extending on opposite sides of said valve for supporting the same when out of cooperative relation to said conduit.

11. In a valve structure, a conduit, a valve movable into and out of cooperative relation with said conduit, and operating means extending on opposite sides of said valve for supporting the same when out of cooperative relation to said conduit and during its movement out of cooperative relation to the conduit.

12. In a valve structure, a conduit, a valve movable into and out of cooperative relation with said conduit, and rails extending on opposite sides of said valve for actuating the same and supporting it when out of cooperative relation to said conduit.

13. In a valve, relatively movable seats, sealing means cooperating with one of said seats, a contractile and expansile member for effecting relative movement of said seats, and means for producing axial movement of said contractile and expansile member upon an increase or decrease in the effective diameter of said member.

14. In a valve, a pair of seats, a valve disc movable into a position between said seats and into a position entirely outside of said seats, and a contractible split ring extending circumferentially of the valve for effecting a predetermined relative movement between said seats to clamp the valve in any position therebetween and to bring said seats together when the valve is out of position therebetween.

15. In a valve structure, a casing comprising relatively movable substantially axially aligned seats adapted to cooperate with opposite sides of a valve body, and means effective substantially in line with said seats for effecting relative movement therebetween, said means comprising a circumferentially extending contractible split ring with externally operable connections for changing the operative position of said means.

16. In a valve, a flanged head carrying a relatively fixed seat, a second flanged head of similar construction in opposed relation thereto, a flexible sealing member supported by said second head, a seat carried by said sealing member, a valve disc for cooperation with said seats, and a contractible ring adjacent said heads for actuating said member and its seat.

17. In a valve, a flanged head carrying a relatively fixed seat, a second flanged head of similar construction in opposed relation thereto, a flexible sealing member supported by said second head, a seat carried by said sealing member, a valve disc for cooperation with said seats, and a contractible ring for producing relative movement between such seats for sealing purposes.

18. In a valve structure, a pair of conduit sections, a flanged head cooperating with each of said sections and projecting inwardly thereof, seats carried by said heads, a valve for cooperation with said seats, a contractible ring for producing relative movement between said seats, said valve having a pivotal mounting between said heads and being eccentrically disposed relative to the axis of said seats.

In testimony whereof I have hereunto set my hand.

EDGAR E. BROSIUS.